US012654345B2

(12) United States Patent
Fuellgrabe et al.

(10) Patent No.: US 12,654,345 B2
(45) Date of Patent: Jun. 16, 2026

(54) PERSONAL CARE DEVICE

(71) Applicant: Braun GmbH, Kronberg (DE)

(72) Inventors: Martin Fuellgrabe, Bad Camberg (DE); Christian Neyer, Eschborn (DE)

(73) Assignee: Braun GMBH, Kronberg (DE)

( * ) Notice: Subject to any disclaimer, the term of this patent is extended or adjusted under 35 U.S.C. 154(b) by 712 days.

(21) Appl. No.: 17/850,821

(22) Filed: Jun. 27, 2022

(65) Prior Publication Data

US 2023/0001594 A1 Jan. 5, 2023

(30) Foreign Application Priority Data

Jun. 30, 2021 (EP) .................................... 21182670

(51) Int. Cl.
*B26B 19/38* (2006.01)

(52) U.S. Cl.
CPC ........ *B26B 19/388* (2013.01); *B26B 19/3853* (2013.01)

(58) Field of Classification Search
CPC .............. B26B 19/3853; B26B 19/386; B26B 19/3873; B26B 19/388
See application file for complete search history.

(56) References Cited

U.S. PATENT DOCUMENTS 4,796,359 A * 1/1989 Oprach ................. B26B 19/048 30/43.92
5,745,995 A 5/1998 Yamashita et al.
6,497,043 B1 * 12/2002 Jacobsen ................. B26B 21/40 30/34.05
8,579,041 B2 * 11/2013 Pellenc ................ B27G 19/003 30/381

(Continued)

FOREIGN PATENT DOCUMENTS

EP 3546153 A1 10/2019
EP 4112251 A1 * 1/2023 ......... B26B 19/3853

(Continued)

OTHER PUBLICATIONS

Extended EP Search Report and Written Opinion for EP21182670.6 dated Mar. 15, 2022, 11 pages.

(Continued)

*Primary Examiner* — Jason Daniel Prone
(74) *Attorney, Agent, or Firm* — Gerd Zetterer

(57) ABSTRACT

Personal care devices such as hair removal devices or electric shavers include a working head, a handle, an adjustment device, and a hazard determination device. The working head is configured for applying a personal care treatment to a body surface. The handle is attached to the working head to enable a user to manually move the working head along the body surface. The adjustment device is configured to adjust various settings of the working head. The hazard determination device sends a hazard signal to the adjustment device when a hazard condition to the personal care device is recognized, such as a freefall condition, high temperature, or low battery charge. Example hazard determination devices may include acceleration sensors, gyrosensors, temperature sensors, or voltage detectors. The adjustment device responds to the hazard signal by adjusting a setting of the working head into a safe harbor setting to protect the personal care device.

18 Claims, 1 Drawing Sheet

(56) References Cited

U.S. PATENT DOCUMENTS 8,615,886 B1 * 12/2013 Childers ............. B26B 21/4056 30/44
8,752,301 B2 * 6/2014 George ................... B27B 17/00 30/381
9,457,485 B2 * 10/2016 Pohl ...................... B26B 19/386
9,849,598 B2 * 12/2017 Damkat ................ B26B 19/388
10,071,500 B2 * 9/2018 George ................... B27B 17/00
10,310,593 B2 * 6/2019 Kingma ................ G06F 1/3231
10,751,892 B2 8/2020 Godlieb et al.
10,960,560 B2 * 3/2021 Robinson .............. B26B 19/388
11,027,442 B2 * 6/2021 Fuellgrabe ............ B26B 19/388
11,097,437 B2 * 8/2021 Fuerst ................... B26B 19/388
11,548,177 B2 * 1/2023 Fuellgrabe ............ B26B 19/388
11,766,107 B2 * 9/2023 Znamenskiy ......... B26B 19/388 345/629
11,858,154 B2 * 1/2024 Palero ................... B26B 19/388
12,246,461 B2 * 3/2025 Georgakis ........... B26B 19/3873
12,269,182 B2 * 4/2025 Mulder ................. B26B 19/388
12,454,070 B2 * 10/2025 Neyer ................... B26B 19/388
12,570,015 B2 * 3/2026 Neyer ................... B26B 19/388
2004/0181951 A1 * 9/2004 Wittke .................... B27B 17/00 30/382
2009/0000124 A1 * 1/2009 Micinilio ................ B26B 19/28 30/45
2010/0064532 A1 * 3/2010 Wittke ................. B27G 19/003 30/382
2012/0036725 A1 * 2/2012 Osborne ............... B27B 17/083 30/383
2014/0137714 A1 5/2014 Krenik
2015/0205279 A1 * 7/2015 Simeth .................. B26B 19/388 30/32
2015/0360305 A1 * 12/2015 Willgert .................. B27B 17/00 30/272.1
2016/0107323 A1 * 4/2016 Krans ................... B26B 19/388 30/123
2017/0232624 A1 * 8/2017 King ................... B26B 21/4056 30/34.05
2018/0111278 A1 * 4/2018 Godlieb ................ B26B 19/388
2019/0224866 A1 7/2019 Amavasai et al.
2019/0299434 A1 10/2019 Fuerst et al.
2019/0299437 A1 10/2019 Fuellgrabe et al.
2022/0080607 A1 * 3/2022 Brenner ................ B26B 19/386
2022/0134586 A1 * 5/2022 Bos ....................... B26B 19/388 30/42
2022/0203564 A1 * 6/2022 Santana ................ B26B 19/388
2023/0032330 A1 * 2/2023 Neyer ................. B26B 19/3853
2023/0033691 A1 * 2/2023 Knorr ................... B26B 19/388
2023/0157432 A1 * 5/2023 Brada ................... B26B 19/388 606/133
2023/0211515 A1 * 7/2023 Blatter .................. B26B 19/388 30/41.7
2023/0256632 A1 * 8/2023 Walker .................. B26B 19/388 30/201
2023/0278244 A1 * 9/2023 Nguyen ................ B26B 19/388 83/13
2023/0329417 A1 * 10/2023 Brada .................... A45D 44/00
2023/0330878 A1 * 10/2023 Wang .................... B26B 19/388
2024/0217131 A1 * 7/2024 LePori .................. B26B 19/388
2024/0269873 A1 * 8/2024 Flinsenberg .......... B26B 19/388
2024/0424700 A1 * 12/2024 Palero .................. B26B 19/388

FOREIGN PATENT DOCUMENTS

JP S6483288 A 3/1989
JP H099516 A 1/1997
JP H0923571 A 1/1997
JP 2002320399 A 10/2002
JP 2023007463 A * 1/2023 ........... B26B 19/388
JP 2024155935 A * 10/2024 ......... B26B 19/3853
KR 20170133961 A 12/2017

OTHER PUBLICATIONS

Partial EP Search Report and Written Opinion for EP21182670.6 dated Dec. 10, 2021, 12 pages.

* cited by examiner

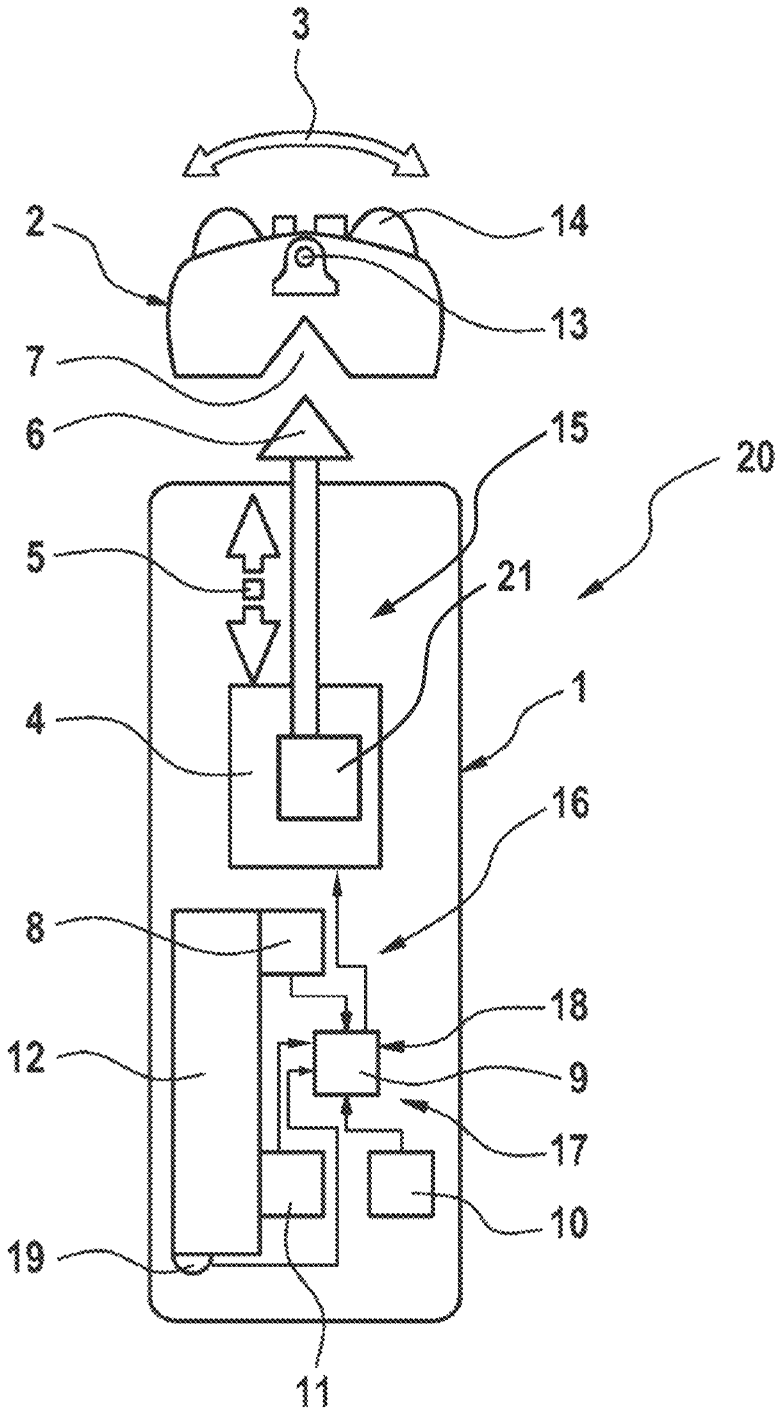
3
2
14
13
7
6
15
20
5
21
4
1
16
8
18
12
9
17
10
19
11

PERSONAL CARE DEVICE

FIELD OF THE INVENTION

The present invention relates to a personal care device, in particular a hair removal device such as an electric shaver, comprising a working head for effecting a personal care treatment to a body surface, a handle for moving the working head along the body surface, and an adjustment device for adjusting a mechanical setting and/or a mechanical function of the working head and/or of a part thereof.

BACKGROUND OF THE INVENTION

Personal care devices are widely used to apply different types of personal care treatments to users, wherein such personal care devices may include hair removal devices such as epilators, shavers or razors, which may be electric or manual and/or wet or dry, or beard trimmers. Furthermore, other personal care devices having such working heads may include dental care appliances such as electric or manual tooth brushes, interdental cleaners or gum massaging devices, or skin treatment devices such as massaging devices or vibrators.

So as to improve the efficiency and work result of the personal care treatment, the working head and/or parts thereof such as the cutting tools, shaving blades or cartridges may be supported movably relative to the handle and/or relative to other components of the working head so as to allow for a better adaption to the skin contour. For example, the entire working head may pivot and/or swivel and/or dive about/along various axes relative to the handle. It also has been suggested to allow for additional pivoting and/or swiveling and/or diving movements of the cutter cartridges relative to each other and/or relative to a working head frame so as to further enhance contour adaption. Similar movability is known for other personal care devices.

Depending on the personal preferences of a user and depending on the working/operation scenario, however, it may be desired to modify the mechanical setting and/or the mechanical function of the working head such as restricting the pivoting/swiveling range or increasing/decreasing stiffness. For example, prior art reference EP 3 546 153 A1 discloses an electric shaver having a plurality of sensors for detecting the user's behavior so as to differentiate between natural behavior and non-natural behavior, wherein, in response to such detection of the user's behavior, the mechanical setting of the working head is adjusted to better fit the shaver's operational behavior to the user's preferences.

Such adaption of the mechanical setting in response to detected user patterns is of course helpful to improving work results but may be detrimental to other goals such as safety, wear and tear of the personal care device, or energy efficiency.

SUMMARY OF THE INVENTION

It is an objective underlying the present invention to provide for an improved personal care device, avoiding at least one of the disadvantages of the prior art and/or further developing the existing solutions.

A more particular objective underlying the invention is to provide for an improved personal care device having an increased resiliency and an extended life cycle.

A further objective underlying the invention is an improved endurance of structural components of the personal care device such as the working head or the drive unit or other mechanical actuating units.

In order to achieve at least one of the aforementioned objectives, it is suggested to make use of the adjustability of the mechanical setting and/or mechanical function of the working head and the parts thereof not only for adjusting the working treatment to the user's preferences and user behavior, but to follow the personal care device's needs when adjusting such mechanical settings and/or mechanical functions. More particularly, the mechanical setting and/or mechanical function of the working head and/or parts thereof and/or an electronic or motor setting are modified to protect the personal care device from damages and/or premature wear and tear.

According to an aspect, the personal care device may include a hazard determination device for determining hazards for the personal care device, wherein the adjustment device may be configured to adjust the working head and/or a part thereof into a save mechanical setting and/or save mechanical function in response to a hazard signal from the hazard determination device.

When a hazardous situation is determined, the adjustment device is automatically activated and/or deactivated and/or controlled to achieve a protective configuration of the mechanical setting and/or mechanical function of the working head.

For example, the hazard determination device may include a drop or freefall determination module for determining a drop or freefall of the personal care device onto the floor or other surfaces which, when hitting them, would likely damage the personal care device.

In addition or in the alternative, the hazard determination device may be configured to issue the hazard signal when the personal care device is subject to unusually high or unusually low temperatures and/or one of the components of the personal care device becomes unusually hot and/or unusually cold.

These and other advantages become more apparent from the following description giving reference to a drawing and possible examples.

BRIEF DESCRIPTION OF THE DRAWINGS

FIG. 1: a side view of a personal care device in terms of an electric shaver comprising a handle and a shaver head pivotably connected thereto, wherein the allowed pivoting or swiveling range of the shaver head can be adjusted and restricted, respectively.

DETAILED DESCRIPTION OF THE INVENTION

According to an aspect, the adjustability of the mechanical setting and/or mechanical function of the working head and/or a part thereof is used for safeguarding the working head and/or the entire personal care device against risky scenarios and protecting the personal care device against damages from external impacts and/or operational hazards. The personal care device may include a hazard determination device for automatically determining hazards for the personal care device, wherein the adjustment device may be configured to adjust the working head and/or a part thereof into a save mechanical setting and/or a safe mechanical function in response to a hazard signal from the hazard determination device indicative of a scenario posing a risk to the intactness and/or structural integrity of the device. When a hazardous situation is determined, the adjustment device is automatically brought into a protective configuration and the working head is automatically adjusted into a safeguarding mechanical setting and/or safeguarding mechanical function to protect the working head and/or a part of the personal care device against damages.

So as to bring the working head into such safeguarding mechanical setting and/or function, the adjustment device may be activated or deactivated and/or controlled in a specific way, depending on the structure and functioning of the adjustment device. For example, when the adjustment device is configured to provide for a safeguarding mechanical setting in its non-operative state, the adjustment device may be deactivated in response to a hazard signal. Such deactivation may be effected during use of the personal care device, i.e. when the personal care device is switched on, and/or despite a request for a different setting by the user which may be overruled in response to the hazard signal. On the other hand, when the adjustment device needs to be energized to provide for a safeguarding setting, it may be activated. More generally, the adjustment device is controlled to provide for a safeguarding setting and/or safeguarding function upon receipt of a hazard signal from the hazard determination device.

The adjustment device may adjust at least one working parameter of the personal care device and/or a setting thereof may be changed so as to provide for a safeguard mechanical setting and/or mechanical function in response to a hazard signal. Such mechanical settings or functions may include the movability of the working head relative to the handle and/or the movability of a part of the working head relative to a working head base part or other elements of the working head. In addition or in the alternative, the mechanical setting and/or function to be influenced by the adjustment device, may include the operation of one or more working tools such as a long hair cutter or short hair cutter or groups thereof, and/or the position of a working tool relative to other tools, and/or the operation of a lubricant applicator for applying a lubricant to the body portion to be treated.

More particularly, the personal care device may have a pivotable suspension of its working head to allow for pivoting and/or swiveling of the working head relative to the handle about at least one axis, wherein the adjustment mechanism may be configured to adjust the pivoting stiffness of the working head's suspension and/or the resistance and/or unwillingness of the working head against pivoting and/or swiveling movements so as to give the personal care device a less contour adaptable handling on the one hand and a more comfortable, smoother handling on the other hand. More particularly, the adjustment mechanism may vary the torque and/or force necessary to pivot the working head relative to the handle and/or to achieve a certain pivot angle of the working head variating from a neutral position thereof.

In a similar way, one or more elements of the working head such as a hair cutter cartridge may be pivotably suspended by the working head in addition or in the alternative to the pivotable suspension of the entire working head relative to the handle. The adjustment mechanism may vary the pivoting stiffness of such pivotable element and/or its resistance and/or unwillingness against pivoting movements.

So as to achieve a safeguarding setting for such pivotably suspended working head and/or pivotable supported working head element, the adjustment mechanism may be controlled, for example deactivated in response to a hazard signal from the hazard determination device so as to provide for a reduced pivoting stiffness and/or an increased willingness to pivot.

In the alternative or in addition to a pivotable suspension, the working head and/or an element thereof such as a cutter cartridge may be supported relative to the handle and/or relative to other elements of the working head so that the working head may dive relative to the handle and/or the working head element may dive relative to other working head elements along an axis substantially perpendicular to a skin contact contour of the working head and/or perpendicular to the skin surface to be treated. For such diving movement, the adjustment device may be configured to modify the diving stiffness and/or the resistance against diving movements. More particularly, the adjustment device may change the force necessary to make the working head and/or an element thereof dive along such axis and/or achieve a certain diving distance.

When the working head is provided with such diving suspension, the adjustment device may be controlled, in particular deactivated so as to bring the diving suspension into a most resilient or most flexible configuration allowing for easy diving with minimum forces necessary, in response to a hazard signal.

In the alternative or in addition to adjusting pivoting and/or diving stiffness, the adjustment device may be configured to adjust the angular pivoting range and/or diving range of the working head and/or of the movable element thereof to allow a larger or smaller maximum angular displacement and/or a larger or smaller maximum diving displacement. Such variable pivoting range and/or diving range may be used during operation to provide the personal care device with a lower contour adaptation ability to the user's skin contour when the maximum available pivoting angle or diving displacement is smaller or with higher swivel resistance whereas, on the other hand, a more comfortable, smoother feeling is provided with a larger maximum pivoting angle and/or a larger maximum diving range.

So as to achieve a safeguarding mechanical setting, the adjustment device may be controlled, in particular deactivated so as to make the largest possible angular displacement and/or the largest possible diving displacement available to the working head and/or to the movable element thereof, when the hazard determination device issues the hazard signal.

So as to protect not only the working head, but also the adjustment mechanism, another possible reaction of the hazard signal may include bringing the adjustment mechanism into a safe harbor configuration. More particularly, an actuator of the adjustment mechanism may be brought into a save position when a hazard scenario is determined. For example, the adjustment mechanism or an adjustment element thereof such as the actuator may be decoupled from the working head and/or from the adjustable working head element. When the adjustment mechanism is decoupled from the working head and/or from the handle and/or from the adjustable working head element, no destructive forces can be transferred to the adjustment elements and as a consequence, they are protected.

In addition to such measures, a passive overload protection may be provided for the adjustment mechanism to achieve additional safety of the involved mechanical parts. For example, an overload clutch may be provided between the adjustment train between the actuator of the adjustment device and the working head and the working head element, respectively, wherein such overload clutch may open the mechanical connection and protect the previously mentioned adjustment elements. As soon as the overload event has gone, the connection may be reestablished and the overload clutch may close again and/or get into engagement.

In addition or in the alternative, it may help the personal care device to survive hazardous scenarios when the adjustment device is able to modify other operational parameters in response to a hazard signal from the hazard determination device. For example, a drive speed and/or a reciprocating frequency and/or amplitude may be reduced, and/or a trading intensity and/or cutting speed is reduced when a formal hazard is detected. More particularly, the adjustment device may be configured to change a mechanical function of at least one of the aforementioned operational parameters in response to a hazard signal from the hazard determination device.

Depending on the type of hazard and/or the intensity of the hazard detected, the adjustment device may provide for only one of the aforementioned measures or a combination thereof. For example, when the personal care device faces a hard hit onto the floor, the adjustment device may reduce mechanical stiffness of the working head's suspension. On the other hand, when the drive unit and/or the energy storage such as a battery faces harm due to very low or very hot environmental conditions, the driving speed of the working tool of the working head may be reduced. In the alternative, the driving speed may be reduced and pivoting/diving stiffness may be reduced (to reduce skin contract pressure and thus, driving resistance) when a thermal hazard to the drive unit is detected.

So as to determine various types of hazard, the hazard determination means may include various sensors of different types, wherein, basically, it may be sufficient when the hazard determination device includes at least one sensor.

More particularly, the hazard determination device may include a drop or freefall determination module for determining a drop or freefall of the personal care device and issuing the hazard signal upon determination of a drop of the personal care device.

In response to such determination of a freefall scenario, the adjustment device may provide for the most flexible mechanical setting of the working head, such as a reduced pivoting and/or diving stiffness and/or may provide for the maximum available pivoting range and/or diving displacement. When the personal care device hits the ground or any other surface at the end of such freefall scenario, it may help the personal care device to survive such hit onto the ground when the working head may pivot away and/or dive away to absorb at least some of the mechanical energy due to hitting the ground.

Said drop determination module may include at least one sensor or detector for detecting at least one parameter indicative of a drop or freefall. For example, the drop determination module may include an acceleration sensor for detecting a freefall of the personal care device. Such acceleration sensor may be mounted in or at least near to the center of gravity of the device. In a freefall scenario, such sensor is subject to an acceleration which is zero or at least close to zero in all three directions. The person having ordinary skill in the art would recognize that an acceleration sensor detects a force acting on a test mass inside a body of the sensor, relative to the body of the sensor. When the acceleration sensor is at rest, the force of gravity acts on the test mass while the sensor body is held still by the surface on which it is resting, whereby the sensor has a baseline reading of the acceleration due to gravity (about 9.8 $m/s^2$). When the acceleration sensor is in freefall. even though the acceleration of the whole sensor is increasing downwardly at 9.8 $m/s^2$, both the test mass and the sensor body are accelerating at the same rate, i.e., there is no relative difference in acceleration to measure. Thus, in freefall, an acceleration sensor indicates an acceleration of zero.

Irrespective of the mounting position of such sensor, it may be a multiaxial acceleration sensor able to detect accelerations in two or three axes. In the alternative or in addition to such multiaxial sensor, a plurality of sensors may be provided for detecting accelerations in different axes. For example, a first sensor may be provided to detect accelerations along two axes or directions perpendicular to each other and perpendicular to the longitudinal axis of the handle. A second sensor may be provided for detecting accelerations along said longitudinal axis of the handle. On the other hand, so as to have a reduced number of parts and an easy manufacturing process, it may be advantageous to have only one sensor able to detect accelerations along three different axes perpendicular to each other.

The output signal of the at least one acceleration sensor may be fed to an evaluation unit which may be included in an electronic controller of the personal care device. Such evaluation or analysis unit may be configured to compare the acceleration signal to at least one threshold value or to threshold values for the different acceleration axes. More particularly, the evaluation unit may be configured to recognize an acceleration value, which is smaller than a predefined threshold in all three dimensions for a defined minimum time of duration. In such case, i.e. when the acceleration signal and/or acceleration value is smaller than the threshold in all three dimensions over a period longer than said time threshold, freefall is assumed or determined.

The limit for the acceleration values may be set to a threshold value, which is significantly lower than the gravitational acceleration. Irrespective of the threshold for the amount of acceleration, the time threshold in terms of the predefined minimum time duration or time interval may be set to a time value significantly shorter than the time the device needs to fall from a typical working height to the ground. For example, the time threshold may be set to a time value which the device needs to fall down onto the ground from a height of a quarter of a meter or from half a meter or from one meter.

In addition or in the alternative to such acceleration sensor, the freefall determination module may include a gyroscopic sensor and/or a gyrometer for determining rotatory acceleration and/or rotatory speed of the personal care device about one or more axis. Such gyroscopic sensor and/or gyrometer may be positioned close to the gravitational center of the personal care device. For example, such gyroscopic sensor and/or gyrometer may be combined with the aforementioned acceleration sensor to form a sensor unit, and/or may be accommodated within the housing of the acceleration sensor.

The sensor signal of such gyrosensor may be fed to an evaluation unit which may be the same evaluation unit as for the acceleration signal, wherein such evaluation unit may compare the rotatory angle and/or rotatory acceleration and/or rotatory speed with a threshold value, wherein the hazard signal may be triggered when such threshold is exceeded. In addition or in the alternative, the gyrosignal overtime may be analyzed to determine, for example, a trend of the gyrosignal. For example, when rotatory acceleration shows a steep increase, a hazard signal may be issued.

In particular, the evaluation unit may be configured to issue the hazard signal when rotations are observed that combine a rotation speed and a rotation angle and/or a rotatory acceleration of the personal care device beyond defined values, justifying the assumption of a freefall.

In addition or in the alternative, the evaluation unit may be configured to assume a freefall of the device and thus, issue a hazard signal for the adjustment device when the acceleration signal of the acceleration sensor and/or the gyrosignal of the gyrosensor shows suddenly a large value and/or a sudden, significant increase. Such suddenly large acceleration and/or suddenly large gyrosignal usually appears when the personal care device, on its way falling down, hits an object or a surface on its way to the ground.

For example, a threshold value for such sudden large acceleration may be set significantly higher than the gravitational acceleration. For example, when the acceleration value exceeds 125% or 150% or 200% of the gravitational acceleration, it may be assumed that the personal care device hits onto the ground or an object on its way to the ground so the evaluation unit may issue the hazard signal to bring the working head and/or the adjustment device into a save mechanical setting and/or into a safe harbor function.

In addition or in the alternative to the aforementioned freefall determination module, the hazard determination device may include a temperature sensor for determining temperature loads onto temperature sensitive elements of the personal care device. The temperature signal of such temperature sensor may be fed to an evaluation unit to determine, for example, very low environmental temperatures and/or very low temperatures of an element of the device and/or very high environmental temperatures and/or very high temperatures of one or more elements of the personal care device.

For example, the temperature sensor may be configured for determining the temperature of a battery or accumulator and/or the temperature of a driving unit. A very low temperature of the battery, for example, may be detrimental to the battery performance so energy should be saved when the battery is too cold and only basic functions of the personal care device may remain active. In addition or in the alternative, a very low temperature of the drive unit may mean increased driving resistance so driving modes with high energy consumption may be prevented. On the other hand, also high temperatures exceeding a certain threshold may trigger a hazard signal to switch-off at least one function or reduce intensity of a function to protect the personal care device.

More particularly, the aforementioned adjustment device for adjusting the mechanical setting and/or mechanical function of the working head may be activated or deactivated or controlled to assume a safe harbor configuration and/or an energy saving configuration. For example, upon detection of a temperature below a lower threshold or above an upper threshold, the adjustment device may be brought into a predefined position if it is not already in such position anyway. As soon as such configuration is given, the adjustment device may not be used anymore until the temperature comes back into a non-hazardous temperature window. Another option could be to deactivate the adjustment mechanism irrespective of its current position to save energy, upon detection of a temperature outside a predefined temperature window.

On the other hand, when the adjustment device is controlled to provide for a predefined safe harbor mechanical setting and/or mechanical function, the working head and/or the adjustable element thereof may be brought into a configuration in which a maximal head movability is given and/or a minimum stiffness for pivoting and/or diving is given.

In addition or in the alternative issuing a hazard signal in response to a temperature load determination module, the hazard determination device may also include a battery charge module for determining the charging level of the battery, wherein a hazard signal may be issued upon determination of a charging level below a certain threshold value.

The battery charging level may be determined in different ways. For example, the battery charge determination module may include a voltage sensor and/or a voltage determination circuit for determining battery voltage. In addition or in the alternative, relevant parameters of a charger device may be detected and analyzed to determine the charging level of the battery. For example, any charging current and also discharging current may be determined to calculate the charge level of the battery.

Upon detection of a low charge scenario, the aforementioned measures may be taken, for example the adjustment mechanism may be brought into a safe harbor configuration and then possibly deactivated. In addition or in the alternative, other energy saving measures may be taken such as reducing driving frequency and/or amplitude or driving speed.

These and other features become more apparent from the example shown in the drawings.

As can be seen from FIG. 1, the personal care device 20 may be configured as a shaver such as an electric shaver. Irrespective of the personal care function, the device 20 may include an elongated handle 1 that may be formed by a housing accommodating further components of the device.

A working head 2 may be pivotably supported at one end of the handle 1 about one or more pivot axis. For example, the working head 2 may swivel about a swivel axis 13 extending perpendicular to the longitudinal axis of the handle 1 and parallel to one of the main axis of the working head. Arrow 3 illustrates such possible swiveling movement.

The working head 2 may include one or more working tools 14 for effecting the desired personal care treatment. In case of a shaver, such working tools 14 may include cutting tools such as a cutter block reciprocating or rotatorily moving below a perforated shear foil, and/or a long hair cutter and/or a short hair cutter and/or a combination thereof.

The mechanical setting and/or the mechanical function of the working head 2 may be adjusted and/or variably controlled by an adjustment device 15, wherein such adjustment device 15 may, for example, vary the swiveling range and/or the swiveling stiffness of the working head 2. As shown by FIG. 1, swiveling may be allowed and blocked by the adjustment device 15, and/or the swiveling range for the working head may be varied by the adjustment device 15.

As shown by FIG. 1, the adjustment device 15 may include a movably supported restrictor 6 which may be a wedge-like element that may be movably supported at the handle 1 and/or may be moved towards and away from the working head 2 in the direction of arrow 5. Such restrictor 6 may cooperate with a restrictor counterpart 7 which may be provided at the working head and/or which may include a contour in terms of, for example, a tapered recess into which the wedge-shaped restrictor 6 may enter.

The adjustment device 15 may include an actuator 4 for moving and/or driving the restrictor 6 into a more restrictive position and a less restrictive position, wherein the actuator 4 may be configured to drive the restrictor 6 only into a fully restrictive position and a minimum restrictive position. In the alternative, the actuator 4 may be configured to drive the restrictor 6 into one or more intermediate positions providing for an intermediate restriction of the swiveling range of the working head 2, wherein such intermediate positions may be variable step by step or continuously.

The actuator 4 may include a driving motor such as an electric motor 21 for driving the restrictor 6 into the desired position.

During normal operation of the personal care device 20, the adjustment device 15 may be responsive to one or more operational parameters indicative of use of the personal care device and/or indicative of a user's behavior. In addition to such normal use of the adjustment device 15, it may be part of a hazard prevention system of the personal care device 20 to prevent the personal care device from damages and/or hazardous situations.

More particularly, the personal care device 20 includes a hazard determination device 16 for automatically determining hazards for the personal care device, wherein the adjustment device 15 is communicatively coupled to the hazard determination device and_configured to adjust the working head 2 into a safe harbor configuration in response to a hazard signal from the hazard determination device 16.

As shown by FIG. 1, the hazard determination device 16 may include a freefall determination module 17 to automatically determine a freefall scenario in which the personal care device 20 drops unintentionally.

Such freefall determination module 17 may include an acceleration sensor 8 which may be mounted in or near the center of gravity of the personal care device 20. For example, the acceleration sensor 8 may be accommodated inside the handle 1.

In the freefall case, the acceleration sensor 8 may issue a signal indicative of an acceleration which is 0 or at least close to 0 in all three directions.

The output signal of the acceleration sensor 8 may be fed to an evaluation unit 18 which may include or be implemented by an electronic controller 9 which may include a microprocessor and/or a storage for storing data processing results and/or software such as an evaluation algorithm inside the electronic controller of the device or outside within e.g a smartphone software app.

When the evaluation unit 18 recognizes an acceleration value smaller than a predefined threshold in all three dimensions for a predefined minimum time duration, a freefall event may be assumed and the hazard determination device 16 may issue a hazard signal to the adjustment device 15 which is configured responsive to such hazard signal.

The threshold for the acceleration values may be set to a value significantly lower than the gravitational acceleration. The length of the time interval may be set to a time value significantly shorter than the time the device needs to fall from a typical working height to the ground.

Moreover, the freefall determination module 17 may include a gyrosensor 10 to determine rotatory movements in terms of a rotation angle and/or a rotatory speed and/or a rotatory acceleration. Such gyrosensor 10 may feed its gyrosignal to the aforementioned evaluation unit 18.

The gyrosensor 10 may be accommodated in the handle 1 and/or may be combined with the aforementioned acceleration sensor 8. For example, the gyrosensor 10 may be accommodated in the same sensor housing as the acceleration sensor 8.

The evaluation unit 18 may be configured to analyze the gyrosignal of the gyrosensor 10 for characteristics indicative of a freefall scenario. For example, when rotations are observed that combine a rotation speed and a rotation angle of the personal care device 20 beyond a predefined threshold value, a freefall scenario may be assumed, wherein the hazard determination device 16 may issue the hazard signal in such case.

Another option for determining the freefall event may include determination of a sudden increase or a suddenly large value of acceleration, for example a sudden increase of the acceleration signal of the acceleration sensor 8 and/or the gyrosignal of the gyrosensor 10. When the personal care device 20 drops and hits an object on its way to the ground, a sudden increase of the sensor signal of the acceleration sensor 8 and/or of the gyrosensor 10 will occur. The evaluation unit 18 may analyze the sensor signal for such characteristic. For example, the sensor signal may be compared to a threshold, wherein such threshold may be set significantly higher than the gravitational acceleration. Yet another option which can be also combined with the others is that the hazard determination device 16 analyzes an electronic setting or a motor setting. Such electronic setting may be e.g. whether shaver is on or off, which swivel inclination the shaver head may have and the motor setting may be whether the motor is running or not.

When the hazard determination device 16 issues the hazard signal, for example upon detection of a freefall scenario, the adjustment device 15 is controlled to provide for a safe harbor configuration. More particularly, the adjustment device 15 may drive the restrictor 6 into its minimum restrictive position to allow for maximum movement of the working head 2. More particularly, the restrictor 6 may be brought into a position in which no mechanical coupling is given between the working head 2 and the adjustment device 15 so no destructive forces can be transferred to the elements of the adjustment device and as a consequence, they are protected.

In addition to such measures and for additional safety of the involved mechanical parts, a passive overload protection may be built in as well, wherein such overload protection may include, for example, an overload clutch automatically opening when subject to excessive loads and/or excessive torques. For example, when the force and/or torque acting on the actuator 4 of the adjustment device 15 reaches or exceeds a certain predetermined threshold level, such overload clutch may react and may open the mechanical connection to protect the previously mentioned adjustment elements. Such overload clutch may be mounted to the wedge-like restrictor 6 for example. More particularly, the overload clutch may hold the wedge-like restrictor 6 in a predetermined position relative to the driving arm during normal operation and normal loads, whereas it may allow for flexing and/or pivoting away of the wedge-like restrictor 6 upon excessive loads and/or torques.

Furthermore, as can be seen from FIG. 1, the hazard determination device 16 may include a temperature sensor 11 to determine temperature loads onto temperature sensitive elements of the personal care device 20. For example, the temperature sensor 11 may be placed in the interior of the handle 1 and/or close to a battery 12 which is a temperature sensitive component.

The temperature signal of the temperature sensor 11 may be fed to the evaluation unit 18 which may trigger a certain action of the adjustment device 15, for example. More particularly, when the temperature of the battery 12 is too low and/or too high, energy should be saved and only basic functions of the personal care device 20 may be allowed. More particularly, the adjustment device 15 may be brought into a safe harbor configuration in terms of an energy saving configuration. More particularly, the actuator 4 may be driven into a predefined position which may be a position allowing for maximum head movability. After bringing the adjustment device 15 into such configuration, it may be deactivated and/or not used any longer until the temperature gets back into a predefined temperature window.

Moreover, the hazard determination device 16 may include a charging level detector 19 and may be configured to issue a hazard signal upon detection of a charging level of the battery 12 below a certain threshold value. When the battery 12 is almost empty or below the aforementioned threshold value, the remaining energy should be kept for the main function of the device and additional consumption due to adjustment action of the adjustment device 15 should be avoided. More particularly, when the battery level is below the predefined threshold, the adjustment device 15 may be deactivated or, in the alternative, it may be brought into a predefined configuration such as the position of the restrictor 6 allowing for maximum movability of the working head 2 and thereafter, it may be deactivated.

The charging level detector 19 may include a voltage sensor for detecting battery voltage of the battery 12. In addition or in the alternative, the charging level detector 19 may be configured to analyze information from a charging system. For example, a current detector may detect loading current.

What is claimed is:

1. A personal care device comprising:

a working head configured for applying a personal care treatment to a body surface with the working head;

a handle attached to the working head and configured for a user to manually move the working head along the body surface;

an adjustment device coupled with the handle, the adjustment device being configured to adjust at least one of a mechanical setting of the working head or a mechanical function of the working head; and a hazard determination device coupled to the handle and communicatively coupled to the adjustment device, the hazard determination device being configured to issue a hazard signal to the adjustment device when a hazard condition of the personal care device is recognized by the hazard determination device, wherein:

the adjustment device is configured to respond to the hazard signal from the hazard determination device by adjusting the mechanical setting and/or the mechanical function into a safe harbor setting or function to protect the personal care device.

2. The personal care device according to claim 1, wherein:

the hazard condition is a freefall of the personal care device; and the hazard determination device comprises a freefall determination module configured to recognize the freefall and to issue the hazard signal upon determination of the freefall.

3. The personal care device according to claim 2, wherein the freefall determination module comprises:

at least one acceleration sensor; and an evaluation unit coupled to the at least one acceleration sensor and configured to analyze an acceleration signal of the acceleration sensor for a characteristic indicative of free fall.

4. The personal care device according to claim 3, wherein the evaluation unit is configured to issue the hazard signal for freefall when the acceleration signal of the at least one acceleration sensor indicates an acceleration of the personal care device of zero or close to zero in directions of three axes perpendicular to each other.

5. The personal care device according to claim 3, wherein the evaluation unit is configured to issue the hazard signal for freefall when the acceleration signal of the at least one acceleration sensor indicates an acceleration of the personal care device significantly greater than gravitational acceleration.

6. The personal care device according to claim 3, wherein the evaluation unit is configured to issue the hazard signal for freefall when the acceleration signal of the at least one acceleration sensor indicates an acceleration of the personal care device exceeding 125% of gravitational acceleration.

7. The personal care device according to claim 2, wherein the freefall determination module comprises:

at least one gyrosensor; and an evaluation unit coupled to the at least one gyrosensor and configured to evalulate a gyrosignal of said at least one gyrosensor for a characteristic indicative of freefall.

8. The personal care device according to claim 7, wherein the evaluation unit is configured to issue the hazard signal when the gyrosignal of the at least one gyrosensor exceeds a predefined gyro threshold value.

9. The personal care device according to claim 1, wherein the adjustment device comprises:

a moveably supported restrictor supported at the handle and movable toward or away from the working head; and an actuator comprising a driving motor and configured to drive the moveably supported restrictor into one or more positions including a minimum restrictive position and a maximum restrictive position that respectively define a maximum movement range of the working head and a minimum movement range of the working head.

10. The personal care device according to claim 9, wherein adjusting the mechanical setting to the safe harbor setting comprises activating the actuator to drive the restrictor to the minimum restrictive position.

11. The personal care device according to claim 1, wherein the personal care device is a hair removal device.

12. The personal care device according to claim 1, wherein the personal care device is an electric shaver.

13. The personal care device according to claim 1, wherein:

the hazard condition is high temperature or low temperature;

the hazard determination device comprises at least one temperature sensor configured to determine a temperature load onto a temperature sensitive component of the personal care device; and an evaluation unit configured to issue the hazard signal when the temperature load less than a minimum threshold or greater than a maximum threshold.

14. The personal care device according to claim 13, wherein the temperature sensitive component is a battery of the personal care device.

15. The personal care device according to claim 1, wherein:

the hazard condition is low battery charge;

the hazard determination device comprises a charging level detector configured to detect a charging level of a battery of the personal care device; and an evaluation unit configured to issue the hazard signal when the charging level is below a predefined minimum threshold.

16. The personal care device according to claim 1, wherein the safe harbor mechanical setting or the safe harbor mechanical function is selected from a configuration of the adjustment device that maximizes movability of the working head, a configuration of the adjustment device that minimizes moving stiffness of the working head, a maximum a configuration of the adjustment device that maximizes pivoting/swiveling range of the working head, a configuration of the adjustment device that maximizes diving range of the working head, or a configuration that minimizes pivoting/swiveling/diving stiffness of the working head.

17. The personal care device according to claim 1, wherein the safe harbor mechanical setting and/or safe harbor mechanical function is a configuration of the adjustment device that minimizes energy consumption during use of the personal care device while applying the personal care treatment.

18. The personal care device according to claim 1, wherein the hazard condition is chosen from a freefall of the personal care device, a high temperature, a low temperature, or a low battery charge.

* * * * *